(12) United States Patent
Parkhill

(10) Patent No.: US 7,594,107 B1
(45) Date of Patent: Sep. 22, 2009

(54) METHOD AND APPARATUS FOR UPDATING WEB CERTIFICATES

(75) Inventor: Robert Everett Parkhill, Nepean (CA)

(73) Assignee: Entrust, Inc., Ottawa, Ontario (CA)

( * ) Notice: Subject to any disclaimer, the term of this patent is extended or adjusted under 35 U.S.C. 154(b) by 0 days.

(21) Appl. No.: 09/466,650

(22) Filed: Dec. 20, 1999

(51) Int. Cl.
*H04L 29/06* (2006.01)
*G06F 9/44* (2006.01)

(52) U.S. Cl. .................. 713/156; 717/171; 717/173

(58) Field of Classification Search ......... 717/168–173; 713/156, 176; 709/203, 217
See application file for complete search history.

(56) References Cited

U.S. PATENT DOCUMENTS

| | | | |
|---|---|---|---|
| 5,664,017 A | | 9/1997 | Gressel et al. |
| 5,666,416 A | | 9/1997 | Micall |
| 5,717,758 A | | 2/1998 | Micall |
| 5,894,554 A | * | 4/1999 | Lowery et al. ............. 707/10 |
| 5,940,074 A | * | 8/1999 | Britt et al. ................ 345/749 |
| 6,073,214 A | * | 6/2000 | Fawcett ..................... 717/170 |
| 6,078,951 A | * | 6/2000 | Pashupathy et al. ....... 709/217 |
| 6,163,841 A | * | 12/2000 | Venkatesan et al. ....... 713/176 |
| 6,202,207 B1 | * | 3/2001 | Donohue .................. 717/173 |
| 6,209,093 B1 | * | 3/2001 | Venkatesan et al. ....... 713/176 |
| 6,215,872 B1 | | 4/2001 | Van Oorschot |
| 6,233,341 B1 | * | 5/2001 | Riggins .................... 380/277 |
| 6,389,463 B2 | * | 5/2002 | Bolas et al. .............. 709/216 |
| 6,430,688 B1 | * | 8/2002 | Kohl et al. ............... 713/156 |
| 6,442,688 B1 | * | 8/2002 | Moses et al. ............. 713/158 |
| 6,810,410 B1 | * | 10/2004 | Durham .................... 709/203 |
| 6,816,900 B1 | * | 11/2004 | Vogel et al. .............. 709/225 |
| 6,978,365 B2 | * | 12/2005 | England ................... 713/156 |

FOREIGN PATENT DOCUMENTS

EP  0811942 A2 * 10/1997

OTHER PUBLICATIONS

SmartUpdate Developer's Guide; Netscape Communications Corporation; Mar. 11, 1999.*
Laurent, Simon; "Cookies"; McGraw-Hill; New York; 1998.*
"Periodic Root Certification Expiration Frequently Asked Questions", Verisign; www.verisign.com/server2/cus/rootcert/faq.html; Dec. 30, 1999; pp. 1-6.*
"Web Server Certificates: 3.x Root Rollover", Thawte Consulting; secure.american-data.net/www/rollover.html; 1998; pp. 1-2.*
"Technical Information—Root Expiry", Entrust Technologies; Entrust.net; 2000; pp. 1-7.*

* cited by examiner

*Primary Examiner*—Lewis A Bullock, Jr.
*Assistant Examiner*—Jason Mitchell
(74) *Attorney, Agent, or Firm*—Vedder Price PC

(57) ABSTRACT

A method and system for updating data, such as web certificates, software applications, or other data, detects a need to update data based on a communication between a first processing entity, such as a computer with a web browser, and another processing entity, such as a web server. The web server detects the need to update data and automatically redirects communication from the first processing entity and the second processing entity, so that the first processing entity communicates with a third processing entity. The third processing entity provides updated data, such as a new version of a web browser or other software application, and also provides update complete data indicating that the software, web browser or other data has been updated. The update complete data is provided for the second processing entity so that the second processing entity will suitably perform the process requested by the first processing entity.

18 Claims, 3 Drawing Sheets

METHOD AND APPARATUS FOR UPDATING WEB CERTIFICATES

FIELD OF THE INVENTION

The invention relates generally to systems and methods for updating data in communications systems, and more particularly to methods and systems for updating web certificates.

BACKGROUND OF THE INVENTION

The use of certificates, or other data structures for purposes of information security is well known. For example, in public key infrastructures, public key certificates are issued by trusted root certification authorities (CA's) to allow users to confirm that public encryption keys and public verification keys have not expired for other users of the system so that information may be suitably encrypted or a digital signature may be verified based on a certificate issued by, and maintained by, a certification authority. As known in the art, web certificates are typically different from public key certificates since web certificates are typically not managed by a trusted certification authority.

For example, different suppliers of web browsers may incorporate root CA certificates issued by many different sources. Each of these sources may issue a certificate with differing expiration dates. Management of the root CA certificates by a trusted authority is typically not used. Accordingly, a problem arises when different versions of web browsers are used by different users. For example, an older version of a web browser may have root CA certificates that expire sooner than root CA certificate that may be embedded in newer versions of web browsers. Accordingly, various certificate issuing entities may serve as different root CA's and issue certificates having differing expiry periods. When a root CA certificate expires, all servers which have web certificates that were issued by that CA will no longer trust any browser which contains only the expired certificate for that CA.

For a conventional web model, there is typically no way to detect the expiration of a web certificate prior to a request for a session with a web server. For example, web certificates that are preinstalled with web browsers from different issuers are typically not continually checked by the web browser to insure that they have not expired. Typically, a user will only be informed of a problem when the web browser attempts to set up a secure session with a web server. If the web certificate has expired, the session is not granted. One proposed solution has been to require a user to manually update a web browser that has prestored web certificates that expire at later dates. Typically, web servers will detect old web browser versions through, for example, web identification tags embedded in headers and identify a link (e.g., URL) to the site that may contain a new version of a web browser. The user then typically clicks on a URL to connect to the site containing the new software version and downloads the new web browser containing web certificates with expiry periods later than those on previous web browser versions.

Alternatively, other solutions have included automatically detecting the version of the web browser based on the ID tag in the HTTP headers prior to setting up a secure session and identifying a site for a user to connect with to install the new root CA certificate in their browser. In addition, it is generally known to provide automatic software upgrades based on internal timers that a software application may have embedded therein, to notify the user to perform a manual update.

However, a problem arises with such techniques since, inter alia, a user typically is denied a secure session and is additionally required to manually obtain an updated version of a web browser. Accordingly, when a user installs a new version of a web browser it is typically not possible for a web site to known that the web browser has the new root CA certificate without establishing an SSL connection or other suitable secure session that requires the use of a new root CA certificate. This problem can be overcome by issuing a cookie to the user's browser. The next time the user visits the site, the server can check for the cookie. If the cookie exists, the server knows that the user has installed the new root CA certificate. However, other sites that also require the new root CA certificate cannot read that cookie. As such, each different server in a different domain may not be able to identify that the user has already installed the new root CA certificate.

Consequently, there exists a need for a method and system that facilitates the updating of data, such as web certificates, or other data, and allows a user to install or update the data and have the update recognized by differing server domains that participate in the system.

BRIEF DESCRIPTION OF THE DRAWINGS

The invention and its various aspects will be more readily understood in view of the following drawings, wherein.

DETAILED DESCRIPTION OF THE PREFERRED EMBODIMENT

Briefly, a method and system for updating data, such as root CA certificates, software applications, or other data, detects a need to update data based on a communication between a first processing entity, such as a computer with a web browser, and another processing entity, such as a web server. The web server detects the need to update data and automatically redirects communication from the first processing entity and the second processing entity, so that the first processing entity communicates with a third processing entity. The third processing entity provides updated data, such as a new version of a web browser or other software application, and also provides update complete data indicating that the software, web browser or other data has been updated. The update complete data is provided for the second processing entity so that the second processing entity will suitably perform the process requested by the first processing entity.

For example in an embodiment applied to a system employing web certificates, the web browser contacts the web server, the web server, upon detecting an unsuitable version of the web browser, notifies the web browser to go obtain new embedded web certificates. Accordingly, the web server automatically redirects the web browser to a third server such as a software update control server. The software update controller contains the latest version of the software, root CA certificate, or other data required by the web server. The web browser obtains a cookie from the software update controller, as well as a message for the web server embedded in an URL. The message in the URL from the software update controller is detected by the web server so that the web server 1) can issue its own cookie to the browser to indicate that the update has been complete and 2) trusts that the web browser has the unexpired web certificate or other updated data.

The systems and methods may be employed to update the software in different versions, provide unexpired root CA certificates, or provide any other suitable data. The system allows a user that has updated the root CA certificates to connect to a different site after updating wherein the different site detects if the data has already been updated or a new CA certificate downloaded to a web browser by detecting the cookie from the software update controller. For example, a first time through a user manually inserts the new root CA certificate in the web browser. The next time the user accesses a site that is in the program, it will be automatic. The browser gets a cookie and a special message encoded in the URL, or inserted into the HTTP headers, from the software update controller. The web server detects the special message in the URL or the HTTP headers, not in the cookie. The webserver then sets its own cookie for identification at a later date.

Figure 1:
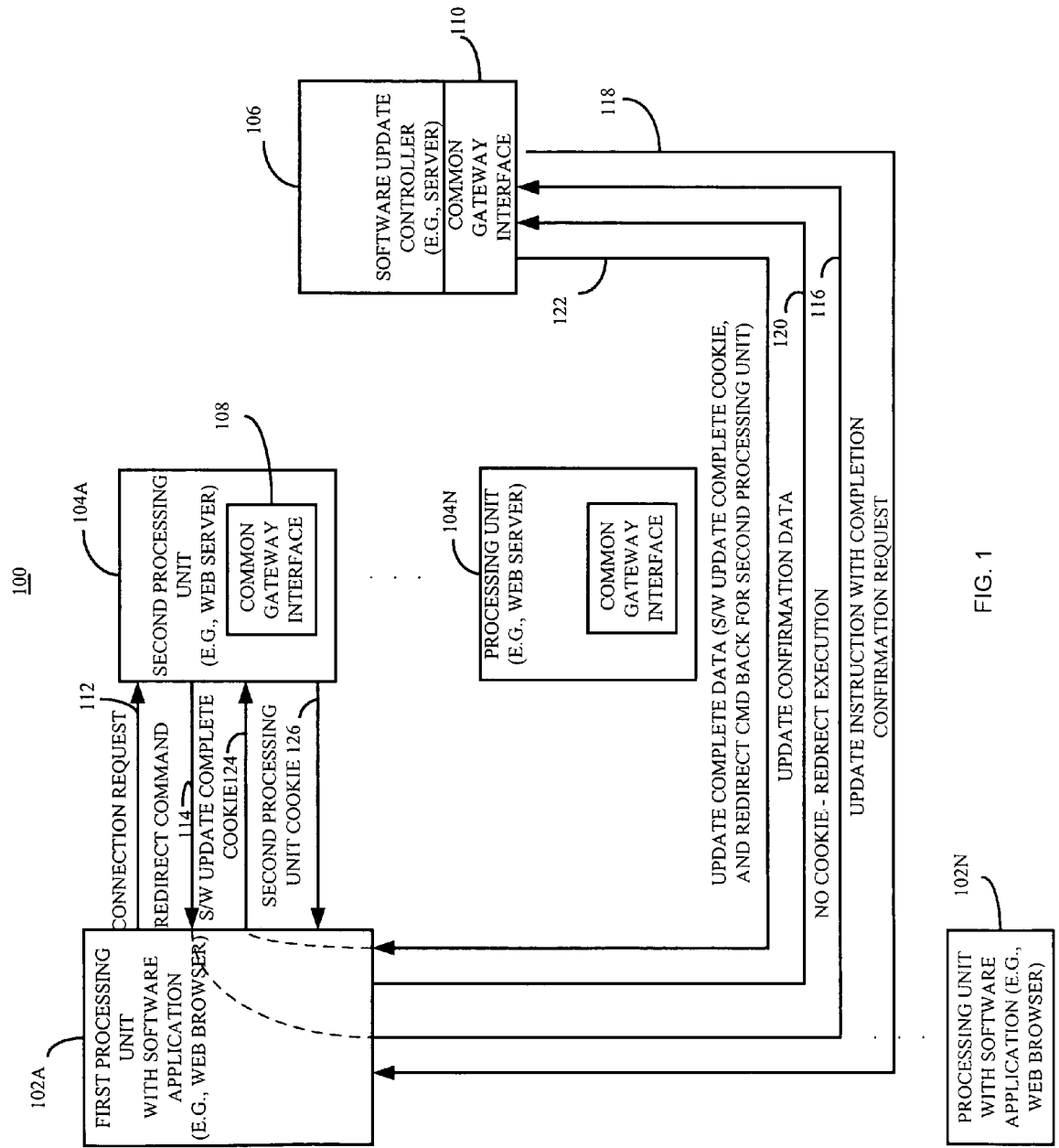
FIG. 1 is a block diagram illustrating one example of a system for updating data in accordance with one embodiment of the invention.

FIG. 1 illustrates a system 100 for updating data that includes first processing entities 102a-102n, such as devices containing a web browser, second processing entities 104a-104n, such as web servers, and a third processing entity 106, such as a software update controller (e.g., another server). The third processing entity 106 is preferably in operative communication with only the first processing entities 102a-102n. Also in a preferred embodiment, the plurality of second processing entities 104a-104n are in operative communication with the first processing entities 102a-102n but are not in communication with the third processing entity 106. For purposes of illustration and not limitation, the disclosed invention will be described with reference to an Internet-based system that employs web certificates as the data to be updated. However, it will be recognized that the invention may be applicable to any suitable information security system such as wireless communication systems, intranet based systems, any systems requiring updating of versions of software, or any other suitable system.

Each of the second processing entities 104a-104n include a common gateway interface 108. Similarly, the third processing entity 106, configured as a software update controller, also includes a common gateway interface 110. The common gateway interfaces 108, 110 may be any suitable software modules, hardware circuits or any suitable combination thereof. A common gateway interface, as known in the art of web servers, may include, for example, an external gateway program to interface with information servers such as HTTP servers, in compliance with the standard as may be found at Web address-hoohoo.ncsa.uiuc.edu/cgi/overview.html.

Figure 2:
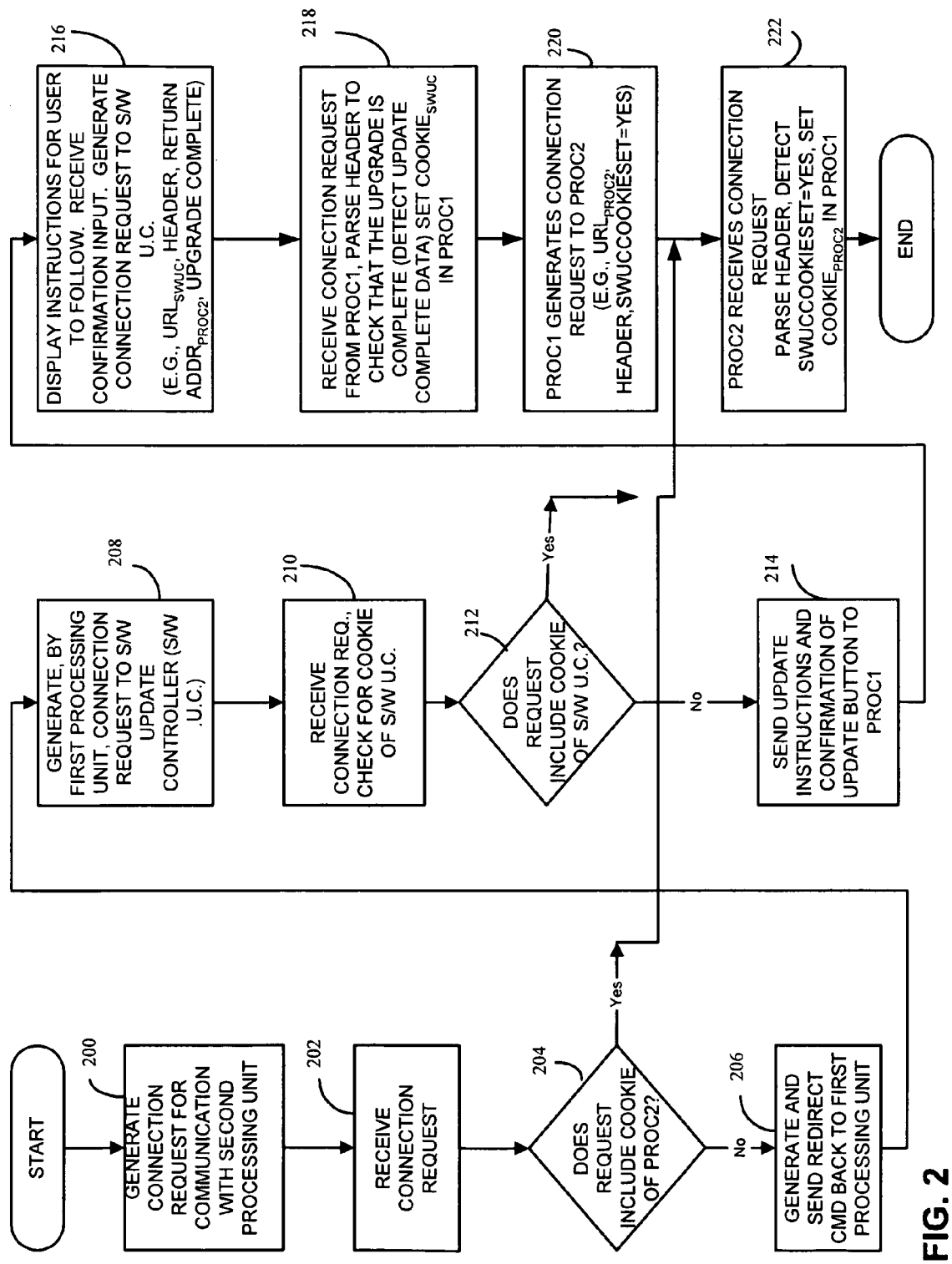
FIG. 2 is a flow chart illustrating one example of the operation of the system of FIG. 1.

Referring to FIGS. 1 and 2, in operation, the first processing entity 102a generates a connection request 112 to the second processing entity 104a to initiate communication with the second processing entity 104a. This is shown in block 200. As shown in block 202, the second processing entity 104a receives the connection request 112. The second processing entity 104a detects a need to update data, such as a need to update web certificates, version of a software application, or any other suitable data, for the first processing entity 102a based on the communication, such as the connection request 112. In this embodiment, detecting the need to update data includes determining whether the connection request 112 includes a cookie (cookie$_{ws}$) (or other suitable tag data) previously provided from the second processing entity 104a, as shown in block 204. For example, where the connection request includes, for example, a URL associated with the second processing entity, a header with, for example, a browser ID tag, and if present, the cookie of the second processing entity stored by the first processing entity. The second processing entity 104 receives the connection request header and checks for whether or not there is a second processing entity cookie. If there is no second processing entity cookie (for example cookie$_{ws}$), the method includes generating and sending a redirect command back to the first processing entity as shown in block 206. For example, the second processing entity automatically redirects the communication from the first processing entity and the second processing entity to the first processing entity and the third processing entity by, for example, the second processing entity sending the universal resource locator (URL$_{swuc}$) associated with the third processing entity, and a return address associated with the second processing entity (return address$_{ws}$). Accordingly, the automatic redirecting is done under control of the second processing entity. The redirect command is shown as command 114 (FIG. 1).

The first processing entity, in response to the redirect command 114, generates a connection request 116 to the third processing entity 106. This is shown in block 208. This redirection is done transparently to the user of the first processing entity. As shown in block 210, the third processing entity 106 receives the redirected connection request 116. The connection request to the software update controller may include, for example, the URL of the software update controller (URLswuc), a header with the cookie of the software update controller (cookieswuc) if it exists, and the return address (return addressws) associated with the second processing entity, such as a web server. The third processing entity 106 then checks the connection request 116 for its own cookie as shown in block 212.

If the connection request does not include the appropriate cookie (cookieswuc) for the software update controller 106, the software update controller 106 recognizes that this may be the first update request required by the first processing entity. Where the redirected connection request 116 does not include the cookie of the destination processing entity, the third processing entity sends update instructions 118 to the first processing entity along with a request for a confirmation of completion of an update. This may be done, for example, by requesting the user to activate a GUI interface confirmation of update button. The update instructions, as shown in block 216, may include, for example, instructions to be displayed for the user to select which version of the software to update to or which web certificates should be embedded in the web browser and whether the new version of the web browser, or other data from the third processing entity was received by the first processing entity. Accordingly, the third processing entity causes the first processing entity to display instructions for the user to follow so that the appropriate version of the software is updated or provided to the first processing entity. The user then selects the confirmation button to indicate that the version has been selected and an update has been completed. This update confirmation data 120 is then sent from the first processing entity to the third processing entity in response to receiving the request for confirmation of the completion of an update. The update confirmation data 120 may include, for example, the URL of the third processing entity (URLswuc), a header with the return address of the second processing entity, and update complete data indicating that the update has been completed. The update instruction includes the new version of the software which may be communicated in any suitable form, such as encrypted using a public key encryption engine, symmetric key encryption engine or any other suitable encryption technique.

As shown in block 218, the third processing entity receives the update confirmation data 120 and parses the header to verify that the update is complete. More particularly, the third processing entity checks to detect that the update complete data is included in the update confirmation data indicating that the first processing entity has properly received and suitably updated its web certificates, software, or other data in accordance with the update instruction 118. The third processing entity parses the header, for example, to see that the update complete data and that the cookie associated with the software update controller for that particular update has been set in the first processing entity. The third processing entity therefore sets the cookie in the first processing entity. The third processing entity then sends an update complete and redirect command 122 back to the first processing entity, for detection by the second processing entity. This update complete data and redirect command 122 contains, for example, a redirect command back to the second processing entity which may include, for example, the URL of the second processing entity along with data representing that the third processing entity cookie has been set in the first processor. As shown in block 220, the first processor generates another connection request 124 to the second processor indicating that the software update is complete. For example, this includes the URL of the second processing entity, and a header with the data software cookie set equal "yes" as provided by the third processing entity. As shown in block 222, the second processing entity receives the connection request 124, parses the (as noted above, this information may be in the URL, or in the headers, depending on the type of CGI requesting—POST or GET) header to detect the cookieswuc set equal yes, and then sets the cookie of the second processing entity in the first processing entity through communication 126. The process continues as needed for other processing entities and other second processing entities, as desired.

As applied to a system requiring web certificates, the first processing entity is a web browser that is operative to request a connection with the web server 104a. The web server 104a detects a need to update web certificate data based on the request for a connection from the web browser by determining, for example, that no cookie associated with the software update controller 106 has been provided to the web browser 102a. The web browser 104a automatically redirects communication from the web browser 104a and the web server, to the web browser and the web certificate update controller in response to detecting the need to update the web certificate. The web server, for example, sends the universal resource locator associated with the web certificate update controller, and other information, as desired, to automatically force the first processing entity to communicate with the software update controller. The software update controller 106, may be web certificate update controller that contains new versions of web browsers that contain web certificates having later expiry periods, for example. The web certificate update controller provides web certificate update complete data 122 for the web server through the web browser.

Figure 3:
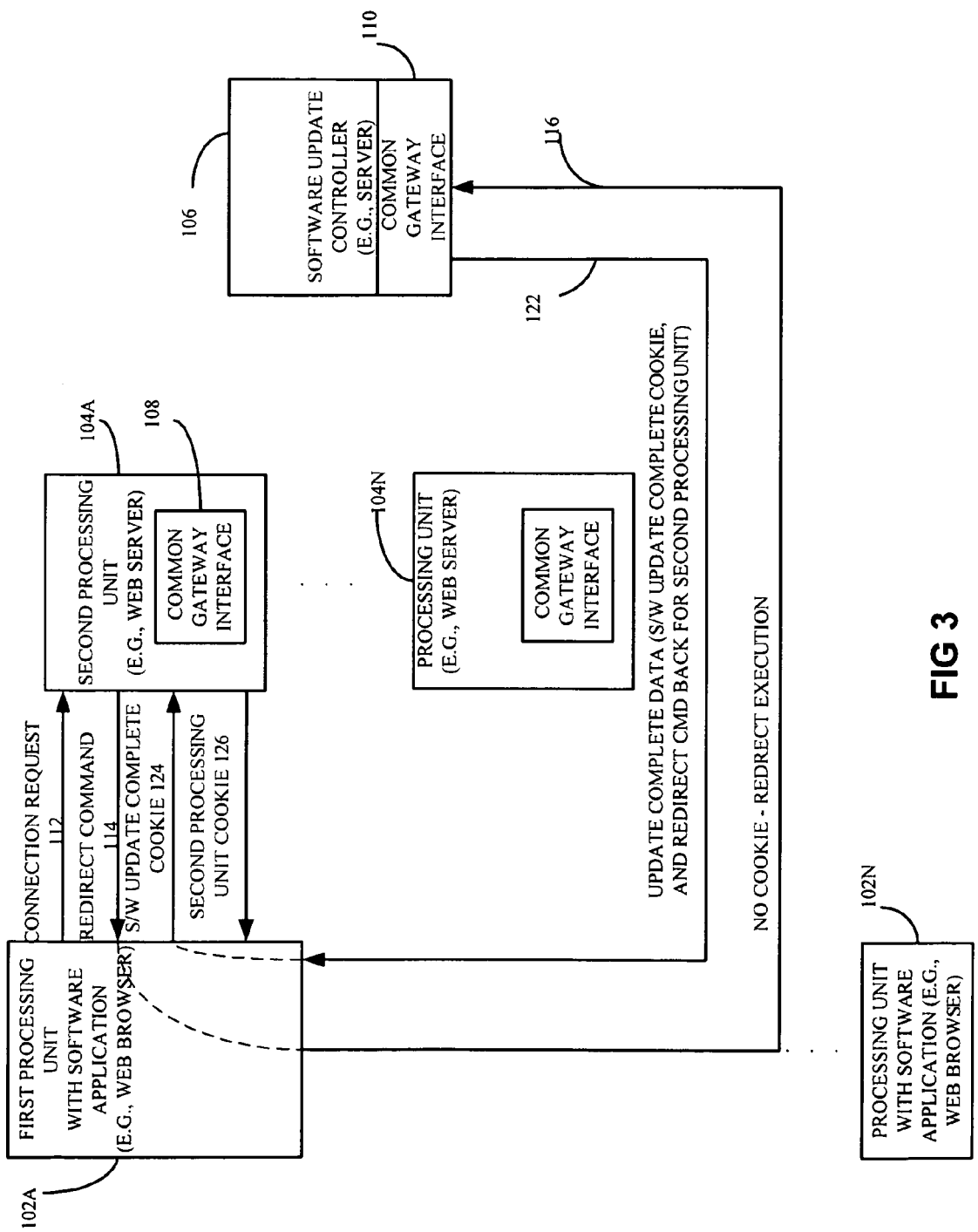
FIG. 3 is a block diagram of the system of FIG. 1 wherein a first update has already occurred.

FIG. 3 represents, for example, where a different second processing entity is being contacted by the first processing entity that has already updated the software or web certificates. In this example, since the web browser already contains the updated web certificates, there is no need for the software update controller to request the user to respond to instructions. In this case, where no cookie is detected for the particular web server, for a given domain, the software update controller will send update complete data in response to the redirected command.

Accordingly, among other advantages, the disclosed system and methods provide an automatic redirection of communication to a third party entity for data updates, such as web certificate updates or other software updates by, for example, embedding a third party cookie as recognized by all servers irrespective of their different domain. In addition, communication to obtain the software update is redirected and transparent to a user, so that the user need not activate communication to obtain the necessary updates. A person manually follows the instructions at the software update server. After they finish the instructions, they are taken back to the web server they were originally visiting.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A computer executed method for updating data for a first digital processing entity, for detection by at least a second digital processing entity comprising:
    detecting a need to update root certification authority (CA) certificate data for the first digital processing entity, based on a communication with the second digital processing entity;
    automatically redirecting communication from the first digital processing entity and the second digital processing entity, to the first processing entity and a third digital processing entity, under control of the second digital processing entity, in response to detecting the need to update the root CA certificate data;
    providing updated root CA certificate data for the first processing entity, by the third processing entity; and
    providing update complete data which is different from the updated root CA certificate data, under control of the third processing entity, for the second processing entity; and
    providing update confirmation data from the first processing entity to the third processing entity,
    wherein providing update complete data includes providing the update complete data for the second processing entity, by way of the first processing entity; and
    wherein automatically redirecting communication from the first processing entity further includes sending, by the second processing entity, a uniform resource locator of the third processing entity, to the first processing entity in response to the second processing entity detecting the need to update data for the first processing entity.

2. The method of claim 1 wherein providing update complete data includes providing the update complete data to the second processing entity.

3. The method of claim 1 wherein detecting a need to update data includes determining whether a connection request between the first processing entity and the second processing entity includes a cookie associated with the second processing entity.

4. The method of claim 1 wherein the data includes certificate data and wherein the method also includes determining whether a certificate update should occur for the first processing entity based on whether cookies have been received by the first processing entity from the second and third processing entities.

5. The method of claim 1 further including automatically redirecting communication from the first processing entity and the third processing entity to the first processing entity and the second processing entity based on update confirmation data.

6. The method of claim 1 including:
sending, by the third processing entity, update instructions to the first processing entity and a request for confirmation of completion of an update;
sending, by the first processing entity, update confirmation data to the third processing entity in response to receiving the request for confirmation of completion of an update.

7. The method of claim 1 wherein the method further includes sending, in response to the update complete data, a cookie from the second processing entity to the first processing entity to confirm acceptance of the update.

8. A computer executed method for updating data for a first digital processing entity, for detection by at least a second digital processing entity comprising:
receiving an automatically redirected communication from the first digital processing entity and the second digital processing entity, redirected to the first digital processing entity and a third digital processing entity, under control of the second processing entity, in response to a detection of a need to update root certification authority (CA) certificate data for the first digital processing entity;
providing update complete data, under control of the third digital processing entity, for the second digital processing entity;
sending, by the third digital processing entity, update instructions to the first digital processing entity and a request for confirmation of completion of an update; and
sending, by the first digital processing entity, update confirmation data to the third digital processing entity in response to receiving the request for confirmation of completion of an update.

9. A computer implemented method for updating certificates for use by a web browser comprising:
detecting a need to update web certificate data for the web browser, based on a communication with a web server;
automatically redirecting communication from the web browser and the web server, to the web browser and a processing entity, under control of the web server, in response to detecting the need to update the web certificate data, by the web server sending a universal resource locator associated with the processing entity to the web browser;
providing web certificate update complete data which is different from updated web certificate data, under control of the processing entity, for the web server; and
determining whether a certificate update should occur for the web browser based on whether cookies have been received by the web browser from the web server and processing entity.

10. The method of claim 9 including providing web certificate update confirmation data from the web browser to the processing entity.

11. The method of claim 9 wherein providing web certificate update complete data includes providing the certificate update complete data for the web server, by way of the web browser.

12. The method of claim 9 including determining whether a certificate update should occur for the web browser based on whether cookies have been received by the web browser from the web server and third processing entity.

13. The method of claim 9 including:
sending, by the processing entity, update instructions to the web browser and a request for confirmation of completion of an update;
sending, by the web browser, update confirmation data to the processing entity in response to receiving the request for confirmation of completion of an update.

14. The method of claim 9 wherein providing web certificate update complete data under control of the processing entity includes sending a redirect command back to the web browser, by the processing entity, to direct the update complete data to the web server, and wherein the method further includes sending, in response to the update complete data to be sent by the first processing entity, a cookie from the web server to the web browser to confirm acceptance of the web certificate update.

15. A web certificate system comprising:
a first device comprising a web browser operative to request a connection with a second device comprising a web server;
the web server, operative to detect a need to update web certificate data based on the request for connection from the web browser wherein the web server automatically redirects communication from the web browser and the web server, to the web browser and a third device comprising a web certificate update controller in response to detecting the need to update the web certificate data, by the web server sending a universal resource locator associated with the web certificate update controller;
the web certificate update controller, in operative communication with the web browser, that provides web certificate update complete data for the web server wherein the web certificate update controller provides updated web certificate data for the web browser in response to the redirected communication; and
wherein the web server determines whether a certificate update should occur for the web browser based on whether cookies have been received by the web browser from the web server and the software update controller.

16. The system of claim 15 wherein the first device comprising the web browser provides web certificate update confirmation data to the web certificate update controller.

17. The system of claim 15 wherein the third device comprising the web certificate update controller provides web certificate update complete data by way of the web browser.

18. The method of claim 9 including providing updated web certificate data for the web browser by the processing entity in response to the redirected communication.

* * * * *